(12) United States Patent
Sinclair et al.

(10) Patent No.: US 8,709,533 B2
(45) Date of Patent: Apr. 29, 2014

(54) TECHNIQUE FOR MANUFACTURING BIT PATTERNED MEDIA

(75) Inventors: Frank Sinclair, Quincy, MA (US); Julian G. Blake, Gloucester, MA (US)

(73) Assignee: Varian Semiconductor Equipment Associates, Inc., Gloucester, MA (US)

( * ) Notice: Subject to any disclaimer, the term of this patent is extended or adjusted under 35 U.S.C. 154(b) by 118 days.

(21) Appl. No.: 13/228,426

(22) Filed: Sep. 8, 2011

(65) Prior Publication Data

US 2012/0064373 A1     Mar. 15, 2012

Related U.S. Application Data

(60) Provisional application No. 61/381,283, filed on Sep. 9, 2010, provisional application No. 61/388,308, filed on Sep. 30, 2010.

(51) Int. Cl.
*G11B 5/708*     (2006.01)

(52) U.S. Cl.
USPC ........................................... 427/130

(58) Field of Classification Search
USPC ................. 427/127, 128, 129, 130, 131, 132; 428/826
See application file for complete search history.

(56) References Cited

U.S. PATENT DOCUMENTS

| 2006/0014052 A1* | 1/2006 | Watanabe et al. | 428/842 |
| 2006/0199043 A1* | 9/2006 | Sugimoto et al. | 428/828.1 |
| 2008/0084635 A1* | 4/2008 | Lee et al. | 360/135 |
| 2009/0059430 A1* | 3/2009 | Dobisz et al. | 360/137 |

FOREIGN PATENT DOCUMENTS

| EP | 0135020 A1 | 3/1985 |
| JP | 1176327 A | 7/1989 |

* cited by examiner

*Primary Examiner* — Michael Cleveland
*Assistant Examiner* — Tabassom Tadayyon Eslami (57) ABSTRACT

A technique for manufacturing hit pattern media is disclosed. In one particular exemplary embodiment, the technique may be realized as a method for manufacturing bit pattern media. The method may comprise forming an intermediate layer comprising a modified region and a first region adjacent to one another, where the modified region and the first region may have at least one different property; depositing magnetic species on the first region of the intermediate layer to form an active region; and depositing non-ferromagnetic species on the modified region of the intermediate layer to form a separator.

19 Claims, 6 Drawing Sheets

TECHNIQUE FOR MANUFACTURING BIT PATTERNED MEDIA

PRIORITY

This application claims priority to U.S. Provisional Application No. 61/381,283, filed Sep. 9, 2010, and entitled "Bit Patterned Media And Technique For Manufacturing The Same" and to U.S. Provisional Application No. 61/388,308, filed Sep. 30, 2010, entitled "Bit Patterned Media And Technique for Manufacturing the Same," each of which is hereby incorporated by reference herein in its entirety.

FIELD

The present application relates to data storage media, particularly to manufacturing a bit patterned media.

BACKGROUND

Figure 1A:
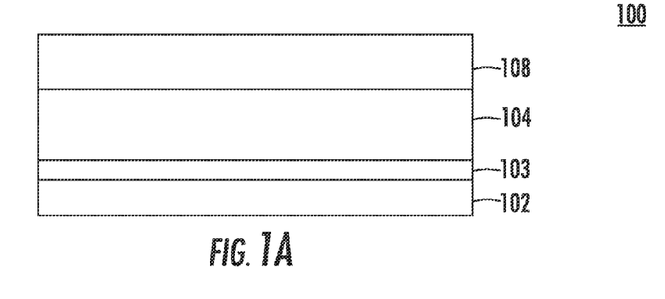
FIG. 1a-1f illustrate a conventional technique for manufacturing BPM.
Figure 1B:
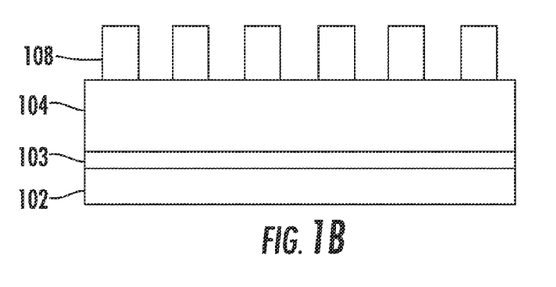
Figure 1C:
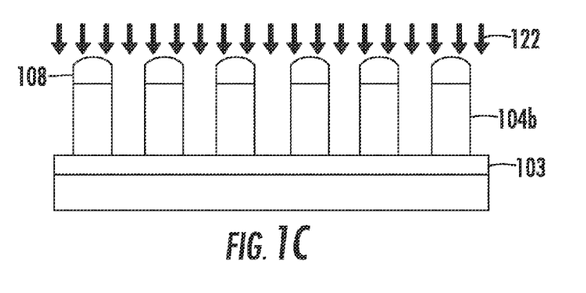
Figure 1D:
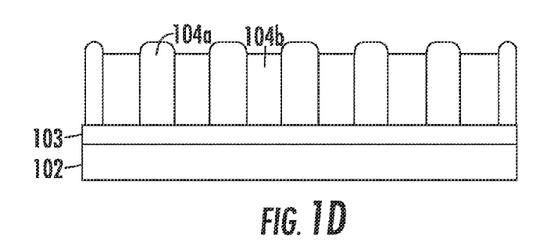
Figure 1E:
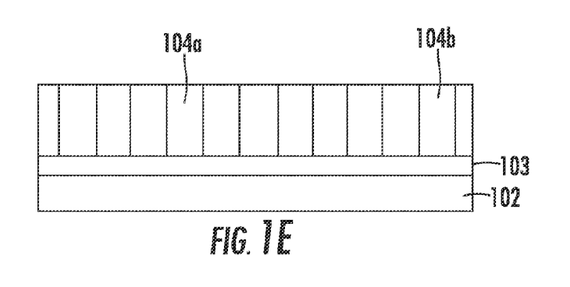
Figure 1F:
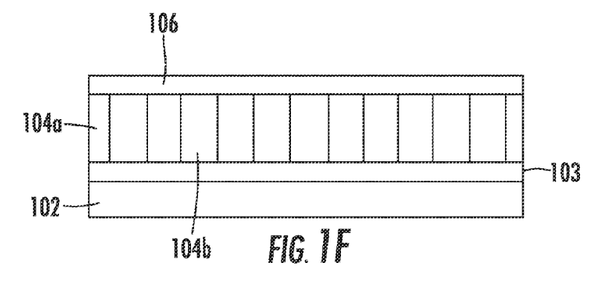

A bit patterned media (BPM), which may be the next generation of data storage media, may extend the data storage capacity of hard drive disks. As illustrated in FIG. 1f, conventional BPM may include a base 102, a storage layer 104, an intermediate layer 103, and a protective layer 106. Within the data storage layer 104, there may be a plurality of active regions 104b, each of which is used for storing a single bit of data, and one or more separators 104a for isolating each active region 104b. As each data bit is stored in each active region 104b, the capacity of the media 100 depends on the number of the active regions 104b. A media 100 with greater number of active regions 104b may store more data.

In conventional BPM, the active regions are formed during manufacturing of the media 100. This is contrary to earlier data storage media, where the active regions are formed while the data is recorded. Referring to FIG. 1a-1f, there is shown a conventional method for manufacturing BPM 100. Initially, the media 100 may comprise a base 102 and the data storage layer 104. The data storage layer 104 may contain ferromagnetic material.

First, a patterning process is performed on the media 100. In this process, a layer of resist 108 is deposited onto the data storage layer 104 (FIG. 1a). Thereafter, the resist layer 108 is patterned using a known lithographic process such as the photolithographic process, the nano-imprint lithographic process, or the direct write electron beam lithographic process. As shown in FIG. 1b, one or more portions of the data storage layer 104 are exposed after the lithographic process.

After the patterning step, an etching step may be performed. An example of the etching step may be the ion milling process. In this step, reactive ions 122 are directed toward the exposed portions of the data storage layer 104, and the ferromagnetic material from the exposed portions is removed (FIG. 1c). Meanwhile, portions of the data storage layer 104 that are not exposed are shielded by the resist 106 and remain on the media 100. When viewed from the side, the resulting media 100 may comprise columns 104b of ferromagnetic material spaced apart and isolated from each other by gaps. The columns that remain on the media 100 may ultimately form the active regions 104b. Areas between the columns (e.g. gaps) are then filled with non-magnetic material with low permeability and remanence to form the separators 104a (FIG. 1d). Thereafter, the media 100 is planarized (FIG. 1e), and a protective coating 106 is deposited onto the media 100 (FIG. 1f). The resulting media 100, as noted above, comprises a data storage layer 104 having a plurality of active regions 104b isolated by one or more non-magnetic separators 104a.

As an improvement, a process of manufacturing BPM that incorporates ion implantation step has been proposed. This process is shown in FIG. 2a-2e.

Figure 2A:
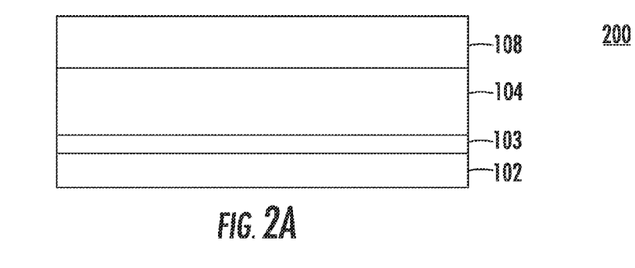
FIG. 2a-2e illustrate another conventional technique for manufacturing BPM.
Figure 2B:
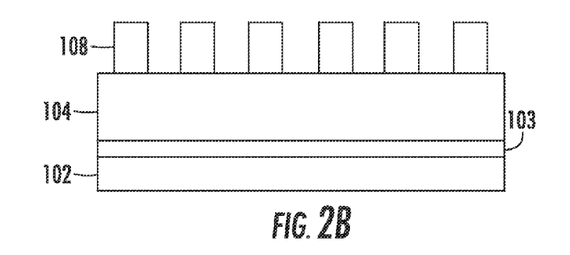
Figure 2C:
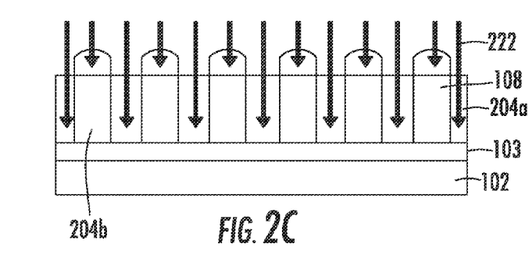
Figure 2D:
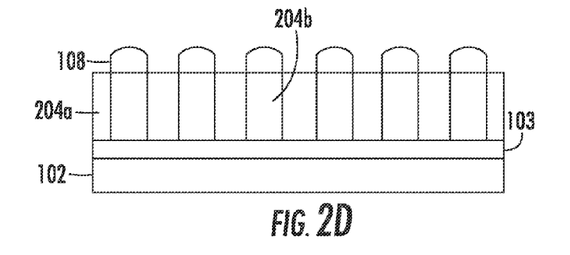

First, the resist layer 108 is deposited on the data storage layer 204 (FIG. 2a). The material in the data storage layer 204 may be ferromagnetic material. After depositing the resist layer 108, the resist layer 108 is patterned using one of the known lithographic processes, and portion(s) of the data storage layer 204 are exposed. Thereafter, ions 222 are directed toward the data storage layer 204. In this process, the ions 222 are implanted into the data storage layer 204. The ions 222 then convert the material in the regions 204a from ferromagnetic material to a material with low permeability and ideally no remanence to form the separators 204a (FIG. 2c). Meanwhile, material in the region 204b that is not exposed and not implanted with the ions 222 may remain ferromagnetic. The resulting data storage layer 204 may include active regions 204b, which were not exposed to the ions, and one or more separators 204a formed via exposure to the ions (FIG. 2d). The separators 204a, when formed, may isolate each active region 204b.

Figure 2E:
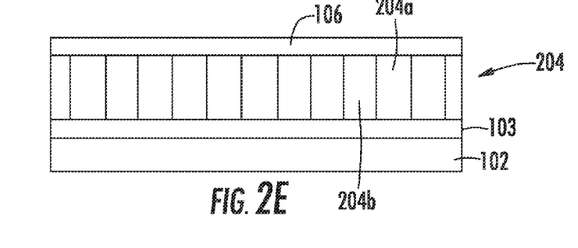

After forming the active regions 204b and the separators 204a, the remaining resist layer 108 is removed, and a protective layer 106 is deposited onto the storage layer 204 (FIG. 2e).

Various approaches may be taken to form the separators 204a. In one approach, the separators 204a are formed via dilution of magnetic material. In this approach, the ferromagnetic material in the exposed regions is implanted with diluting ions, for example ion species that do not exhibit magnetic property, with sufficient dose. In the process, Curie temperature of the resulting material is reduced to room temperature or the material is no longer magnetic at room temperature. To achieve sufficient dilution, atomic concentration of ~10% or more of the diluting ions may be needed. For a media comprising cobalt (Co) based data storage layer of 30 nm thickness, a 10% concentration implies an ion dose of approximately $3 \times 10^{16}/cm^2$. This dose may be proportional to the thickness of the storage layer and thus may be less if the data storage layer is thinner.

In another approach, the magnetic material may be converted by affecting the crystallinity or microstructure of the material in the exposed regions. The ion implantation process is an energetic process that can cause many atomic collisions. During implantation, the material in the exposed regions that is otherwise crystalline may become amorphous and/or disordered. As a result, the material may exhibit low ferromagnetism at room temperature. Meanwhile, the material in the unexposed portions next to the exposed portions may retain its original magnetic property. This approach may be effective if the original ferromagnetic layer is a multilayer that derives its magnetic properties from the interaction of very thin layers in a stack. However, this approach also may require a high ion dose. A typical ion dose necessary to amorphize/disorder a silicon substrate is $1 \times 10^{15}$ ions/cm$^2$ or higher. In a metal substrate, this required dose may be even higher, particularly if the implant is performed at room temperature.

Both approaches, however, have several drawbacks. One such drawback may be limited throughput caused in part by the high ion dose requirement. As noted above, each approach in forming the separator 204a requires an ion dose ranging about $1 \times 10^{16}$-$1 \times 10^{17}$ ions/cm$^2$. However, the beam current in a conventional ion implanter is limited due to the limitations in generating the ions. Accordingly, such a high dose will limit the throughput or increase the time the ion implantation system has to process the media. With limited throughput, the cost associated with manufacturing BPM may be high.

The throughput may also be limited in part by the resist patterning step. As noted above, the electron beam direct write patterning step may be used to pattern the resist. In this process, an electron beam is scanned along one or more directions directly write or pattern the resist. Although this process enables greater resolution, this process is very slow and it is not suitable for high throughput production.

The nano-imprint lithography process, a more efficient resist patterning process may be used to increase the throughput. This patterning process, however, does not produce resist with desired properties. For example, the maximum practical resist height achieved in the nano-imprint lithography process may be limited to about 50 nm. Such resist may not survive the subsequent high dose ion implantation process and/or adequately protect the material underneath. A portion of the resist may sputtered away during ion implantation, and portions of material outside of the exposed region (i.e. material originally under the resist 108) may be implanted with ions and also converted into the separator 204a. Accordingly, less than optimal BPM may result.

Moreover, high dose ion implantation used to form the separator 204a may also contribute to sputtering of the material in the exposed region. This sputtering effect proceeds in proportion to the total dose needed to form the separator 204a. This sputtering effect may result in a non-planar storage layer. Because the BPM manufacturing process that incorporates the ion implantation step is intended to omit the gap filling step (e.g. FIG. 1d), excessive non-planarity between the exposed region and the unexposed region may be highly undesirable.

Accordingly, a new method for manufacturing bit pattern media is needed.

SUMMARY

A technique for manufacturing bit pattern media is disclosed. In one particular exemplary embodiment, the technique may be realized as a method for manufacturing bit pattern media. The method may comprise forming an intermediate layer comprising a modified region and a first region adjacent to one another, where the modified region and the first region may have at least one different property; depositing magnetic species on the first region of the intermediate layer to form an active region; and depositing non-ferromagnetic species on the modified region of the intermediate layer to form a separator.

In accordance with other aspects of this particular exemplary embodiment, the modified region and the first region may have different structure.

In accordance with further aspects of this particular exemplary embodiment, the first region may comprise one or more crystals in a preferred orientation and the modified region may be amorphous.

In accordance with additional aspects of this particular exemplary embodiment, the first region may be amorphous and the modified region may comprise one or more crystals.

In accordance with other aspects of this particular exemplary embodiment, the first region has a plurality of crystals with uniform orientation and the modified region is amorphous.

In accordance with further aspects of this particular exemplary embodiment, the intermediate layer may have at least one of Mg, Ta, and Ti.

In accordance with additional aspects of this particular exemplary embodiment, the separator may comprise $SiO_2$.

In accordance with further aspects of this particular exemplary embodiment, the modified region may have at least one species that is absent in the first region.

In accordance with additional aspects of this particular exemplary embodiment, the modified region and the separator may have at least one species in common.

In accordance with other aspects of this particular exemplary embodiment, the at least one species in common may be Si.

In accordance with additional aspects of this particular exemplary embodiment, the method may further comprise etching a surface of the intermediate layer prior to the forming the active region and the separator.

In accordance with further aspects of this particular exemplary embodiment, the modified region of the intermediate layer may be formed by ion implantation.

In accordance with additional aspects of this particular exemplary embodiment, the ion implantation may be performed at an energy of 15 keV or less.

In accordance with another exemplary embodiment, the technique may be realized as a method for manufacturing a bit pattern media. The method may comprise forming an intermediate layer that comprises a modified region and a first region adjacent to one another, where the modified region and the first region have at least one different property; depositing magnetic species on the first region of the intermediate layer to form an active region; and depositing non-ferromagnetic species on the modified region of the intermediate layer to form a separator, where the active region and the separator are formed simultaneously.

In accordance with other aspects of this particular exemplary embodiment, the first region comprises one or more crystals and the modified region is amorphous.

In accordance to additional aspects of this particular exemplary embodiment, the first region comprises one or more crystals in a preferred orientation and the modified region is amorphous In accordance with further aspects of this particular exemplary embodiment, the modified region may be formed by ion implantation.

In accordance with additional aspects of this particular exemplary embodiment, the ion implantation may be performed at an energy of 15 keV or less.

In accordance with further aspects of this particular exemplary embodiment, the modified region and the separator may contain Si.

In accordance with additional aspects of this particular exemplary embodiment, the method may further comprise etching a surface of the intermediate layer prior to the forming the active region and the separator.

In accordance with other aspects of this particular exemplary embodiment, the first region has a plurality of crystals with uniform orientation and the modified region is amorphous.

In accordance with another exemplary embodiment, the technique may be realized with a data storage media. The media may comprise an intermediate layer having a modified region and a plurality of first regions, where the modified region and the first region have at least one different property; an active region formed on the first region of the intermediate layer, the active region containing a magnetic material; and a separator formed on the modified region, the separator contain a non-ferromagnetic material.

In accordance with further aspects of this particular exemplary embodiment, the intermediate layer may comprise at least one of Mg, Ta, and Ti.

In accordance with additional aspects of this particular exemplary embodiment, the active regions may comprise at least one of Co, Ni, Cr, and Pt.

In accordance with other aspects of this particular exemplary embodiment, the separator may comprise $SiO_2$.

In accordance to further aspects of this particular exemplary embodiment, the modified region and the first region may have different structure.

In accordance with additional aspects of this particular exemplary embodiment, the first region may comprise one or more crystals and the modified region may be amorphous.

In accordance with other aspects of this particular exemplary embodiment, the modified region and the first region have different species.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

DETAILED DESCRIPTION

To solve the deficiencies associated with the methods noted above, novel techniques for manufacturing BPM are introduced. In the present disclosure, the techniques may include forming a data storage layer over an intermediate layer that has been selectively processed. Various processes may be used to selectively process the intermediate layer. In one embodiment, a particle or ion implantation process may be used. In other embodiments, other processes may be used. Examples of other processes that can be used may include a deposition process, a gas immersion laser doping (GILD) process, and a laser or other magnetic wave irradiation process. Despite availability of such processes, the present disclosure focuses on the ion implantation process for the purpose of clarity and simplicity. However, those skilled in the art should recognize that the present disclosure is not limited thereto.

If used, the system for ion implantation process may be a beam-line ion implantation system; a plasma assisted doping (PLAD) or plasma immersion ion implantation (PIII) system; or any other mass analyzed or non-mass analyzed ion implantation. In addition, focused or non-focused ion beam ion implantation system may also be used. The ions or the particles may be charged or neutral sub-atomic, atomic, or molecular ions or particles. Moreover, the types or species of the particles that are used during the particle or ion implantation process are not limited to only those types or species described below.

In addition to the ion implantation process, the techniques may include one or more processes for etching or depositing materials. To perform such processes, various systems may be used. For the purposes of convenience and clarity, the present disclosure may focus on the sputter deposition or etching system.

Figure 3A:
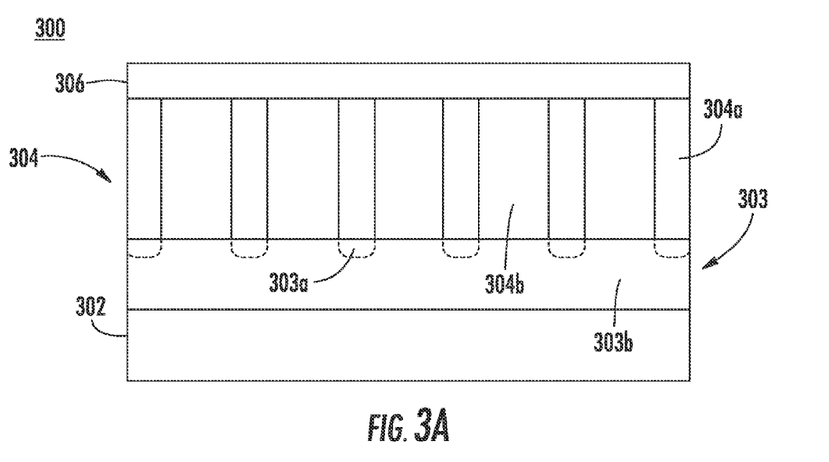
FIGS. 3a and 3b illustrate an exemplary BPM according to one embodiment of the present disclosure.
Figure 3B:
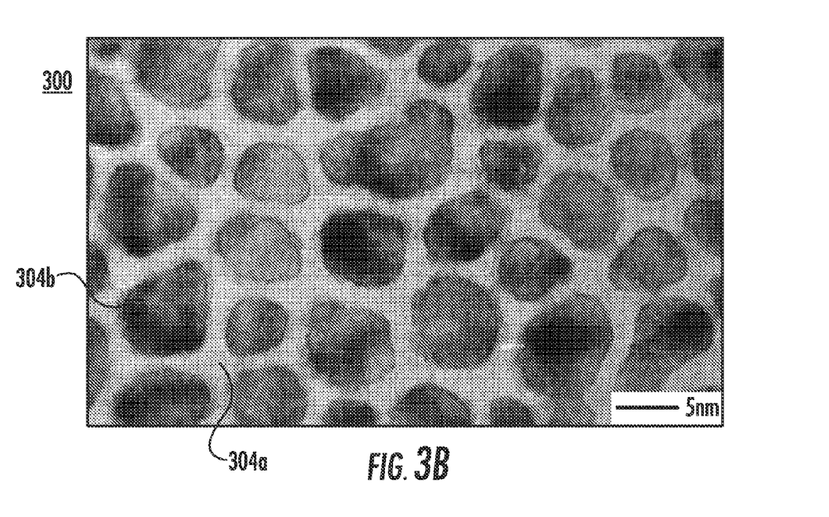

Referring to FIGS. 3a and 3b, there are shown side view and plan view of a BPM (or media) 300 according to one embodiment of the present disclosure. The figures are not necessarily drawn to scale. As illustrated in FIG. 3a, the media 300 may comprise, among others, a base layer 302, a data storage layer 304, and a protective layer 308. As shown in the figure, the data storage layer 304 may be disposed above the base layer 302. Herein, the base layer 302 may be one or more layers that support the data storage layer 304. In one embodiment, the base layer 302 may include a soft underlayer (not shown).

In the present embodiment, the data storage layer 304 may comprise a plurality of active regions 304b, each of which may store a single bit of data. As shown in FIG. 3b, each active region 304b is isolated from one another by a separator 304a. In the present disclosure, the data storage layer 304 may be a single, continuous separator 304a or a plurality of non-continuous separator segments 304a that surround and magnetically decouple each active region 304b.

The BPM 300 may also include an intermediate layer 303. For purpose of clarity and simplicity, the present disclosure describes the intermediate layer 303 being separate from the base layer 302. However, those of ordinary skill in the art will recognize that the intermediate layer 303 may be a part of the base layer 302 or one of the layers that form the base layer 302.

The intermediate layer 303 of the present embodiment may optionally contain a modified region 303a. If the intermediate layer 303 contains the modified region 303a, the region outside the modified region 303a, for the purpose of clarity and simplicity, may be a first region 303b. In the present embodiment, the separator 304a may be disposed on the modified region 303a, whereas the active region 304b may be disposed on the first region 303b. In another embodiment, the separator 304a may be disposed on the first region 303b, whereas the active region 304b may be disposed on the modified region 303a.

If included, the modified region 303a may have at least one property different from the first region 303b. In one embodiment, the modified region 303a and the first region 303b may have different structure and/or crystal orientation. For example, one of the modified region 303a and the first region 303b may have a plurality of crystals, whereas the other one of the modified region 303a and the first region 303b may be amorphous. In another example, one of the modified region 303a and the first region 303b may have crystals or seeds with a preferred orientation that may act as a template for epitaxial growth of the active regions 304b. Meanwhile, the other one of the modified region 303a and the first region 303b may be amorphous or substantially without crystals with preferred orientation. In the present disclosure, the preferred orientation may be one or more orientations that enable or promote epitaxial formation of the active region 304b. As such, a region without the crystals having preferred orientation, may be either amorphous or may have crystals that do not act as template for epitaxial growth of the active regions 304b. In some embodiments, the crystals with preferred orientation may have orientation that is identical to the orientation of the crystals in the active region 304b. In some other embodiments, the crystals with preferred orientation may have uniform orientation.

Another difference between the modified region 303a and the first region 303b may be in the difference of the species. For example, the modified region 303a may contain one or more species that are not contained in the first region 303b.

The intermediate layer 303 may preferably comprise titanium (Ti), magnesium (Mg), or tantalum (Ta) based material containing at least one Ti, Mg, and Ta species. In one embodiment, the intermediate layer 303 may contain Ti species. In another embodiment, the intermediate layer 303 may be magnesium oxide (MgO) containing Mg species. Those of ordinary skill in the art will recognize that the intermediate layer 303 may contain other species.

In the present embodiment, the separator 304a may preferably be non-ferromagnetic with low permeability and remanence. Examples of non-ferromagnetic material may include paramagnetic material, ferrimagnetic material, anti-ferromagnetic material, and any other non-ferromagnetic or non-magnetic material. Preferably, the separator 304a of the present embodiment may be silicon dioxide ($SiO_2$) containing at least silicon (Si) and oxygen (O) species. In another embodiment, the separator 304b may be other non-ferromagnetic material containing other species.

The active regions 304b of the present embodiment, meanwhile, may contain one or more magnetic materials, in one or more layers. In the present embodiment, the active regions 304b are preferably ferromagnetic material. Examples of the species that may contain in the active region 304a may be at least one of cobalt (Co), nickel (Ni), chromium (Cr), and platinum (Pt) species. However, the active regions 304b with other maoetic or ferromagnetic material with high permeability and remanence are not precluded in the present disclosure.

When viewed from the top, the active regions 304b may be substantially circular or having a curved boundary (FIG. 3b). Preferably, the diameter or the cross-sectional thickness (when viewed from the top) of the active region 304b may range between about 5 nm to about 10 nm, Meanwhile, the separator 304a, which may surround each active region 304b, may have a cross sectional thickness ranging about 1 nm to about 4 nm (FIG. 3h). Such a thickness range is preferred as it may magnetically decouple the neighboring active regions 304b to hinder the spin direction therein from affecting one another. The separator 304a with less thickness is not precluded as long as it is capable of sufficiently decoupling the neighboring active regions 304b. The separator 304a with greater thickness, although not precluded, may not be preferred as such a separator 304b may decrease the density or the number of the active regions 304b in the BPM 300.

In the present embodiment, each active region 304b may store a single bit of data. With its active region 304b and the separator 304a, the BPM 300 of the present embodiment may have greater data storage capacity compared to other conventional data storage media.

Figure 4A:
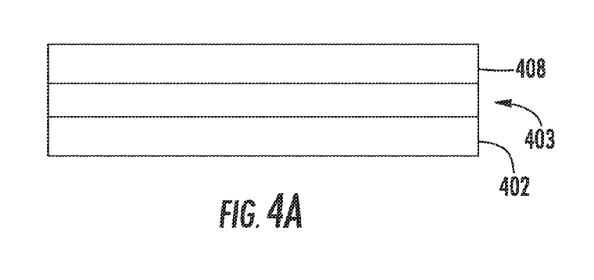
FIG. 4a-4f illustrate an exemplary technique for manufacturing BPM according to one embodiment of the present disclosure.
Figure 4B:
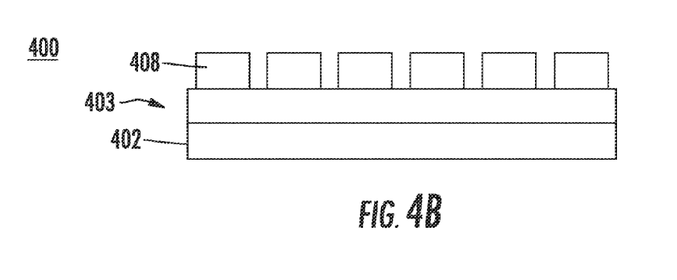
Figure 4C:
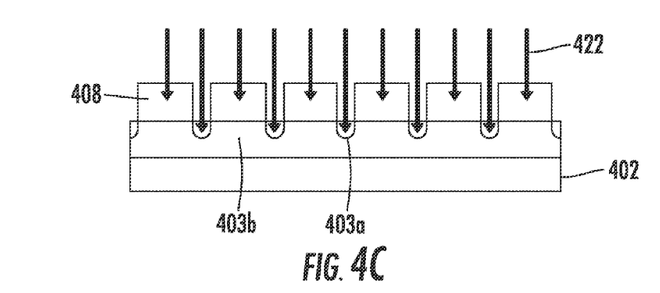
Figure 4D:
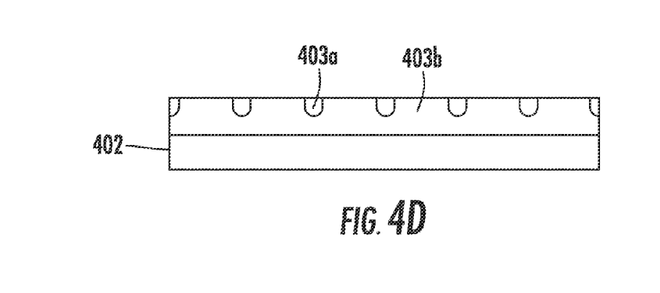
Figure 4E:
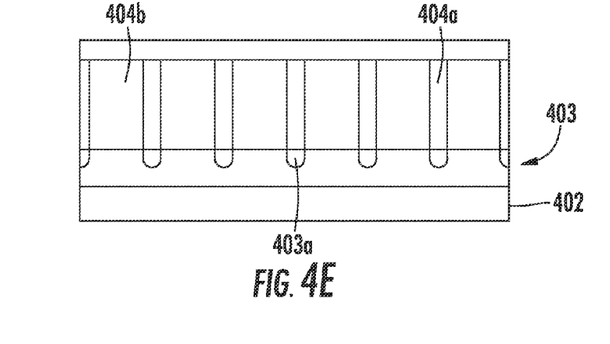
Figure 4F:
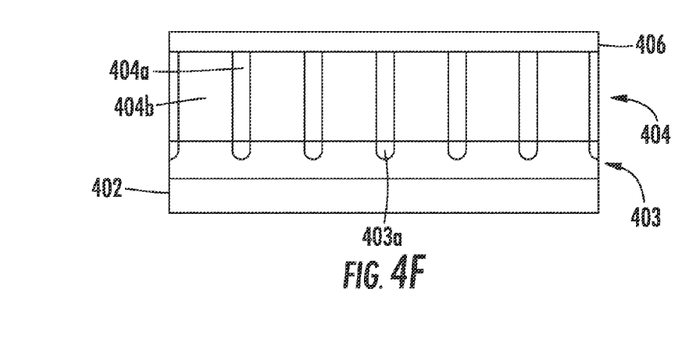

Referring to FIG. 4a-f, there is shown a technique for manufacturing BPM 400 according to one embodiment of the present disclosure. As illustrated in FIG. 4f, BPM 400 of the present embodiment may comprise, among others, an intermediate layer 403, a data storage layer 404, and a protective layer 406. In the data storage layer 404, there may be active regions 404b, each of which is isolated from one another by a separator 404a. Optionally, there may be a modified region 403a in the intermediate layer 403.

To form the BPM 400 shown in FIG. 4f, the intermediate layer 403, which may or may not be a part of a base layer 402, is prepared (FIG. 4a). In the present embodiment, the intermediate layer 403 may comprise a plurality of crystals or seeds with a preferred orientation. Such an intermediate layer 403 is selectively processed and a portion of the intermediate layer 403 is converted to a modified region 403a.

Selective processing of the intermediate layer 403 may be achieved using various processes. In one embodiment, a lithographic process that includes resist patterning may be used. In this process, a layer of resist 408 may be disposed on the intermediate layer 403 as shown in FIG. 4a. Thereafter, a known patterning process such as electron beam direct write lithography, extreme ultraviolet lithography, or nano-imprint lithography may be used to pattern and expose portion of the intermediate layer 403 (FIG. 4b). The exposed portion of the intermediate layer 403 may then be processed to form the modified region 403a. In other embodiments, selective processing of the intermediate layer 403 may be achieved without the lithographic process, In one example, a mask may be used to selectively process portion of the intermediate layer 403. In another example, a system capable of selectively processing portion of the intermediate layer 403 may be used to form the modified region 403a having desired shape and dimension.

In the present embodiment, the modified region 403a may have at least one property different from the first region 403b or a portion of the intermediate layer 403 that is not exposed. In the present embodiment, the modified region 403a may be amorphous or substantially without crystals with preferred orientation. This structure may be different from the structure of the first region 403b that contains crystals with preferred orientation An ion implantation process may be performed in the present embodiment to form the modified region 403a. In other embodiments, other processes may be used. In this process, ions or particles 422 may be introduced into the exposed portion of the intermediate layer 403 to amorphize or otherwise alter the orientation of the crystal in the exposed region (FIG. 4c). As such, the modified region 403a may form. In the first region 403b, the crystals with preferred orientation may be maintained.

The ions or particles 422 that may be used to form the modified region 403a may include charged or neutral subatomic, atomic, or molecular particles or ions. The species of the ions or particles chosen may preferably include hydrogen (H), nitrogen (N), helium (He), neon (Ne), argon (Ar), and krypton (Kr). In the present embodiment, one or more inert species that do not react readily with the species in the intermediate layer 303 are preferred. However, using one or more reactive species is not precluded in the present disclosure.

The ion energy to form the modified region 403a may preferably be low energy, about 15 keV or less. This low energy implantation is preferred as such energy may allow the concentration of the implanted ions or particles 422 to be the maximum near the surface of the modified region 403a. Moreover, the resist 408 will not likely damaged or degraded during this low energy ion implantation step. However, other energies are not precluded in the present disclosure.

If the lithographic process is used, the resist 408 may be removed after forming the modified region 403a (FIG. 4d). A thorough cleaning of the intermediate layer 403 to remove all traces of the resist 408 is preferred. In some embodiments, even few atomic layers of the intermediate layer 403 may be removed. Example of this optional cleaning process may include an etching (e.g. atomic layer etching) and sputter cleaning process. However, other cleaning or etching processes may also be used. The resulting structure may include the intermediate layer 403 containing the modified region 403a and the first region 403b as shown in FIG. 4d.

On the intermediate layer 403 containing the modified region 403a, the data storage layer 404 comprising the separator 404a and the active regions 404b may form. In the present embodiment, non-ferromagnetic separator 403a, for example, SiO$_2$ separator 404a, may form on the modified region 403a. Meanwhile, magnetic active regions 404b, preferably ferromagnetic active regions 404b, may form on the first region 403b. In the present embodiment, the separator 404a and the active region 404b may form simultaneously. In other embodiment, the separator 404a and the active regions 404b may form in separate steps, one after another.

In the present embodiment, the species that may ultimately form the active regions 404b and the separator 404a may be simultaneously introduced near the intermediate layer 403. For example, Si and O, and at least one of Co, Ni, Cr, and Pt may be introduced to form SiO$_2$ separator 404a and active regions 404b containing at least one of Co, Ni, Cr, and Pt. The crystals in the first region 403b with preferred orientation may act as a template and the active region 404b may preferentially and heteroepitaxially form over the first region 403b. Meanwhile, the modified region 404a having amorphous structure or substantially without crystals with preferred orientation may also act as a template for the separator 404a, and the separator 404a may form over the modified region 403a. In one embodiment, the modified region 404a may be amorphous, and amorphous SiO$_2$ separator 404a may form on the modified region 403a. In the present embodiment, a sputter deposition process may be used to form the separator 404a and the active region 404b. In other embodiments, other types of deposition process may be used. As a result, a data storage layer 404 comprising the separator 404a above the modified region 403b and the active regions above the first regions 403a may form.

After forming the data storage layer 404, the protective layer 406 such as, for example, DLC cap layer 406 may be deposited as illustrated in FIG. 4f.

In some embodiments, an optional post treatment process may be performed. Examples of the optional post treatment process may include an annealing process. If performed, this optional process may be performed after forming the separator 404a.

Figure 5A:
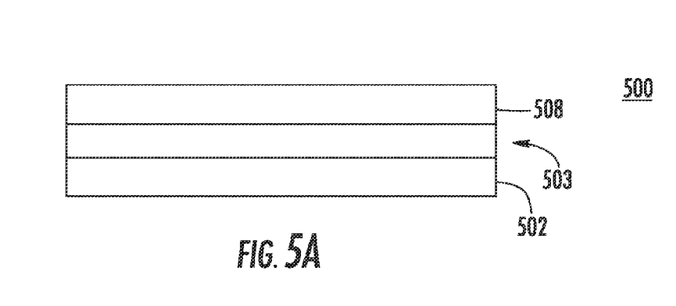
FIG. 5a-5f illustrate another exemplary technique for manufacturing BPM according to another embodiment of the present disclosure.
Figure 5B:
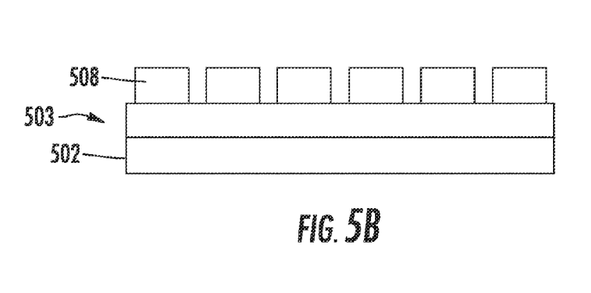
Figure 5C:
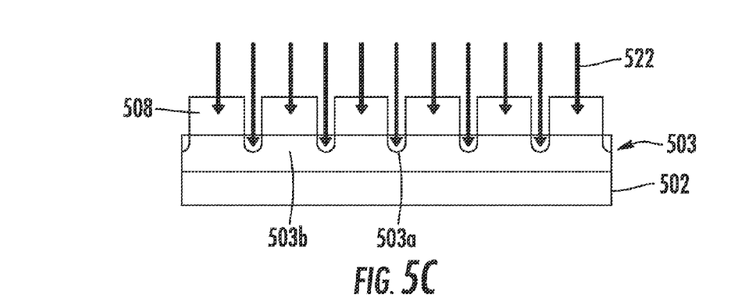
Figure 5D:
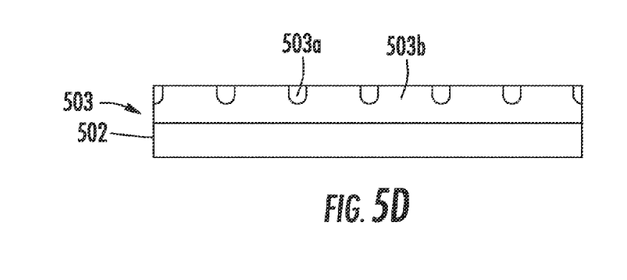
Figure 5E:
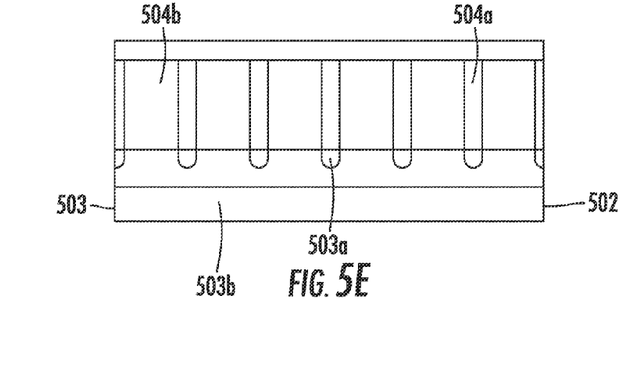
Figure 5F:
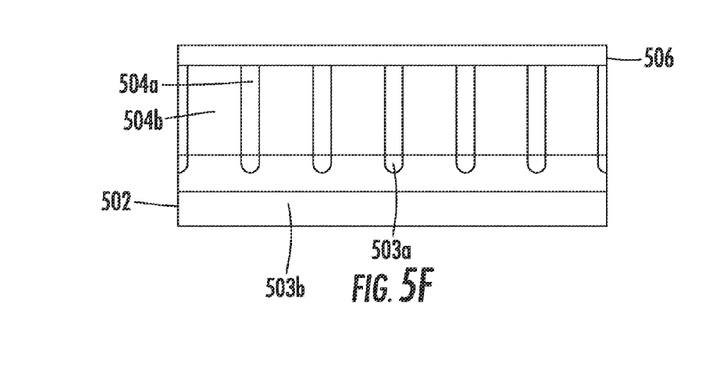

Referring to FIG. 5a-f, there is shown another exemplary technique for manufacturing BPM 500 according to another embodiment of the present disclosure. As illustrated in FIG. 5f, the BPM 500 of the present embodiment may comprise, among others, an intermediate layer 503, a data storage layer 504, and a protective layer 506. In the data storage layer 504, there may be a plurality of active regions 504b, each of which is isolated from one another by a separator 504a. In the intermediate layer 503, there may be a modified region 503a and a plurality of first regions 503b.

To form the BPM 500 shown in FIG. 5f, the intermediate layer 503, which may or may not be a part of a base layer 502, is prepared (FIG. 5a). In the present embodiment, the intermediate layer 503 may comprise a plurality of crystals or seeds with a preferred orientation. Such an intermediate layer 503 is selectively processed, and a portion of the intermediate layer 503 is converted to a modified region 503a.

Selective processing of the intermediate layer 503 may be achieved using various processes. In one embodiment, a lithographic process that includes resist patterning may be used. In this process, a layer of resist 508 may be disposed on the intermediate layer 503 as shown in FIG. 5a. Thereafter, a known patterning process such as electron beam direct write lithography, extreme ultraviolet lithography, or nano-imprint lithography may be used to pattern and expose a portion of the intermediate layer 503 (FIG. 5b). The exposed portion of the intermediate layer 503 may then be processed to form the modified region 503a. In other embodiments, selective processing of the intermediate layer 503 may be achieved without the lithographic process. In one example, a mask may be used to selectively process a portion of the intermediate layer 503. In another example, a system capable of selectively processing a portion of the intermediate layer 503 may be used to form the modified region 503a having desired shape and dimension.

In the present disclosure, the modified region 503a may have at least one property that differs from the first region 503b or the portion of the intermediate layer 503 that is not processed. In the present embodiment, the modified region 503a may contain one or more additional species. If desired, the modified region 503a may also have different structure/crystal orientation. For example, the modified region 503a may be amorphous or substantially without crystals with preferred orientation.

An ion implantation process may be used in the present embodiment to introduce additional species, and/or alter the structure/crystal orientation in the exposed region of the intermediate layer 503, to form the modified region 503a. In other embodiments, other processes may be used. Examples of other processes may include GILD process, diffusion process, or any other species introducing process. For the purpose of clarity and simplicity, the present embodiment focuses on performing ion implantation process. Those of ordinary skill in the art, however, should recognize that the present disclosure is not limited thereto.

In the ion implantation process, the ions or particles 522 that may be used to provide additional species and/or alter the structure/crystal orientation may include charged or neutral sub-atomic, atomic, or molecular particles or ions. The species of the ions or particles chosen may preferably include one or more species that may be contained in the separator 504b. For example, if SiO$_2$ separator 504a is formed, the species that are introduced to form the modified region 503b may include silicon (Si) and/or oxygen (O). Such species may be preferred because such species may enhance the formation of SiO$_2$ separator 504a. If a separator other that SiO$_2$ separator is to be formed, other species may be introduced.

If desired, other species may also be introduced before, during, or after introduction of the species that may be contained in the separator 504b. Such other species may include H, N, He, Ne, Ar, Kr, or any other species that may alter the structure/crystal orientation in the exposed portion of the intermediate layer 503.

The ion energy to form the modified region 503a may preferably be a low energy, about 15 KeV or less. This low energy is advantageous as such energy may allow the concentration of the implanted ions or particles 522 to be the maximum near the surface of the modified region 503a. Moreover, the resist 508 will less likely to be damaged or degraded during this low energy ion implantation step. However, other ion implant energies are not precluded in the present disclosure.

If the lithographic process is used to selectively form the modified region 503a, the resist 508 may be removed after forming the modified region 503a (FIG. 5d). A thorough cleaning to remove all traces of the resist 508 is preferred. In some embodiments, even few atomic layers of the intermediate layer 503 may be removed. Examples of this optional cleaning process may include an etching process (e.g. atomic layer etching) and a sputter cleaning process. However, other cleaning or etching processes may also be used. The resulting structure may include the base 502 and the intermediate layer 503 containing the modified region 503a and the first region 503b, as shown in FIG. 5d.

On the intermediate layer 503 containing the modified region 503a, the data storage layer 504 comprising the separator 504a and the active regions 504b may form. In the present embodiment, non-ferromagnetic separator 504a, for example, $SiO_2$ separator 504a may form on the modified region 503a. Meanwhile, magnetic active regions 504b, preferably ferromagnetic active regions 504b, may form on the first region 503b. In the present embodiment, the separator 504a and the active regions 504b may form simultaneously. In other embodiments, the separator 504a and the active regions 504b may form in separate steps, one after another.

In the present embodiment, the species that ultimately form the separator 504a and the active regions 504b may be introduced simultaneously near the intermediate layer 503. For example, Si and O, and at least one of Co, Ni, Cr, and Pt may be introduced to form $SiO_2$ separator 504a and the active regions 504b containing at least one of Co, Ni, Cr, and Pt. Silicon and oxygen may preferentially deposit over the modified region 503a containing Si and/or O, and formation of $SiO_2$ separator 504a may occur. If the modified region 503a is also amorphous or substantially without crystals with preferred orientation, the structure may also promote formation of the amorphous $SiO_2$ separator 504a on the modified region 503a. The modified region 503a will not likely to serve as a template for formation of the active region 504b. As such, the active region 504b will not likely to form on the modified region 503a. The active regions 504b will instead likely to heteroepitaxially form on the first region 503b which contain the crystals with a preferred orientation.

In the present embodiment, a deposition process such as sputter deposition process may be used to form the separator 504a and the active regions 504b. In other embodiments, other deposition processes may be used. As a result, a data storage layer 504 comprising the separator 504a above the modified region 503a, and the active regions above the first regions 503b, may form. After forming the data storage layer 504, the protective layer 506 such as, for example, DLC cap layer 506 may be deposited as illustrated in FIG. 5f.

In some embodiments, an optional post treatment process may be performed. Examples of the optional post treatment process may include an annealing process. If performed, this optional process may be performed after forming the separator 504a.

Figure 6A:
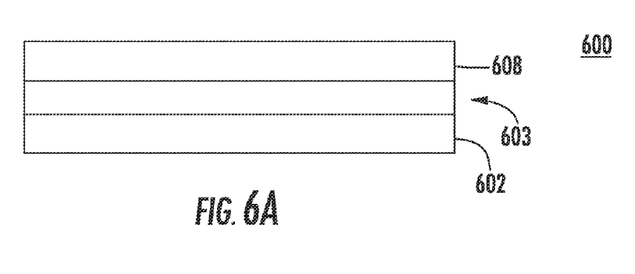
FIG. 6a-6f illustrate another exemplary technique for manufacturing BPM according to another embodiment of the present disclosure.
Figure 6B:
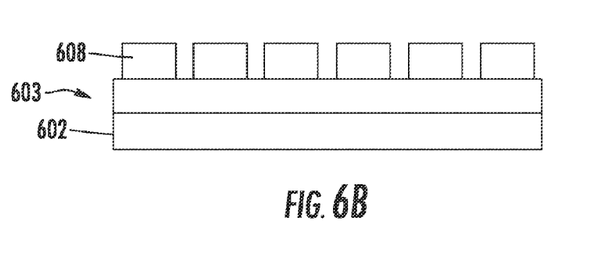
Figure 6C:
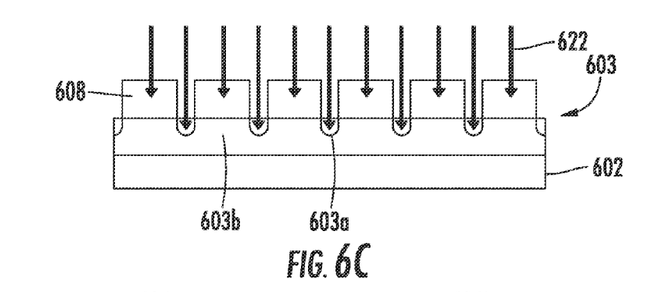
Figure 6D:
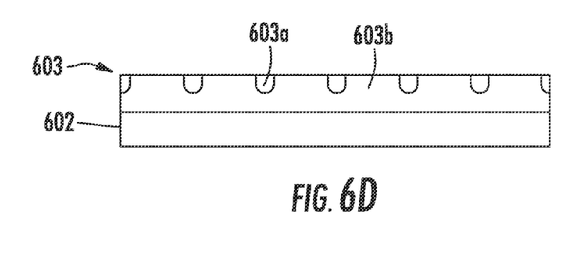
Figure 6E:
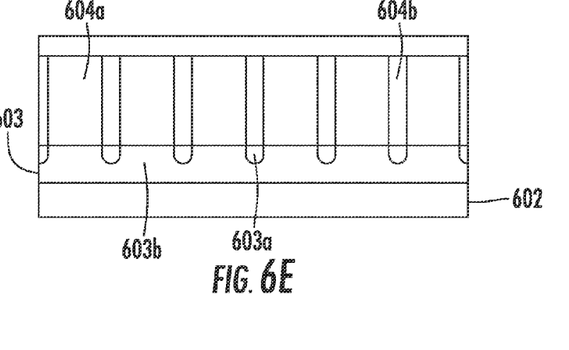
Figure 6F:
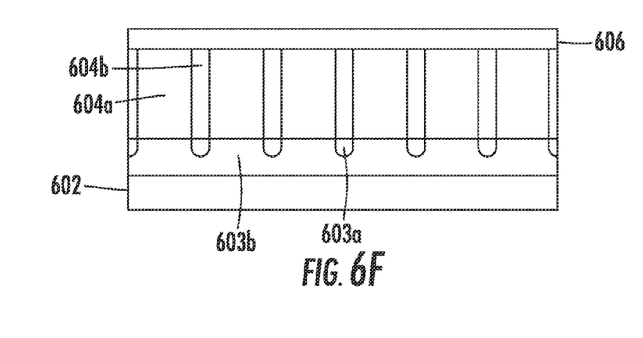

Referring to FIG. 6a-f, there is shown a technique for manufacturing BPM 600 according to another embodiment of the present disclosure. As illustrated in FIG. 6f, BPM 600 of the present embodiment may comprise an intermediate layer 603, a data storage layer 604, and a protective layer 606. In the data storage layer 604, there may be a plurality of active regions 604b, each of which is isolated from one another by a separator 604a. In the intermediate layer 603, there may be a plurality of modified regions 603a.

To form the BPM 600 shown in FIG. 6f, the intermediate layer 603, which may or may not be a part of a base layer 602, is prepared (FIG. 6a). Unlike the previous embodiments, the intermediate layer 603 of the present embodiment may be amorphous or substantially without crystals in preferred orientation. As such, the intermediate layer 603 may not serve as a template for subsequent epitaxial formation of the active regions 604b. Such an intermediate layer 603 is selectively processed, and a portion of the intermediate layer 603 is converted into a plurality of modified regions 603a.

Selective process of the intermediate layer 603 may be achieved using various processes. In one embodiment, a lithographic process that includes resist patterning may be used. In this process, a layer of resist 608 may be disposed on the intermediate layer 603 as shown in FIG. 6a. Thereafter, a known patterning process such as electron beam direct lithography, extreme ultraviolet lithography, or nano-imprint lithography may be used to pattern and expose a portion of the intermediate layer 603 (FIG. 6b). The exposed portion of the intermediate layer 603 may then be processed to form the modified region 603a. In other embodiments, selective processing of the intermediate layer 603 may be achieved without the lithographic process. In one example, a mask may be used to selectively process a portion of the intermediate layer 603. In another example, a system capable of selectively processing a portion of the intermediate layer 603 may be used to form the modified region 603a having desired shape and dimension.

In the present disclosure, the modified region 603a may have at least one property different from the first region 603b or a portion of the intermediate layer 603 that is not exposed. For example, the modified region 603a may have crystals in the preferred orientation, whereas the first region 603b may be amorphous or substantially without crystals in the preferred orientation.

To form the modified region 603a, various processes may be performed. In one embodiment, energy 622, in the form of pulsed laser or flash lamp, may be introduced into the exposed portion of the intermediate layer 603 (FIG. 6c). In other embodiments, the energy 622 may be introduced via other forms/means including phonons, ions, and other particles. Upon introduction, the energy 622 may form the modified regions 603a by altering the structure of the material in the exposed region of the intermediate layer 603. For example, the energy 622 may transform the material in the exposed portion of the intermediate layer from amorphous to crystals in the preferred orientation. Such a transformation may occur with or without melting. If desired, additional species may also be introduced into the modified region 603a using one of the processes described in earlier embodiments. For example, one of N, He, Ne, Ar, Kr, Co, Cr, Ni, and Pt may be introduced. The species may be introduced during the energy 622 introduction step, or before or after.

If the lithographic process is used to selectively form the modified region 603a, the resist 608 may be removed after forming the modified region 603a (FIG. 6d). A thorough cleaning to remove all traces of the resist 608 is preferred. In some embodiments, even few atomic layers of the intermediate layer 603 may be removed. Examples of this optional cleaning process may include an etching process (e.g. atomic layer etching) and a sputter cleaning process. However, other cleaning or etching processes may also be used. The resulting structure may include the intermediate layer 603 containing the modified region 603a and the first region 603b, as shown in FIG. 6d.

On the intermediate layer 603 containing the modified region 603a, the data storage layer 604 comprising the separator 604a and the active regions 604b may form. Unlike the prior embodiments, the active regions 604b may form on the modified regions 603a. Meanwhile, the separator 604a may form on the first region 603b. However, each of the processes by which the active regions 604b are formed and by which the separator 604a is formed may be similar to those described in earlier embodiments. As such, detailed description of the formation process will be omitted.

After forming the data storage layer 604, the protective layer 606 such as, for example, DLC cap layer 606 may be deposited, as illustrated in FIG. 6f. In the present embodiment, the process that may be used to form the separator 604a and the active regions 604b may include a sputter deposition process.

If preferred, an optional post treatment process may be performed. In this optional process, the first region 603a may be annealed and converted into one of poly-crystalline or single crystalline structure. If the optional post treatment process is included, the process may be performed after the deposition of the separator 604a.

Novel techniques for manufacturing BPM are disclosed. In several embodiments, a layer under the data storage layer is processed. In addition, the layer is processed prior to formation of the data storage layer. Such embodiments provide several advantages over conventional techniques for manufacturing BPM. Unlike the conventional techniques, planarization might not be necessary after formation of the data storage layer. In addition, lower ion implantation dose and lower energy may be needed. With such advantages, the techniques of the present disclosure may have higher throughput and less costly.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A method of forming a data storage media, the method comprising: forming an intermediate layer comprising a modified region and a first region adjacent to one another, wherein the modified region is formed by ion implantation, and wherein the modified region and the first region have at least one different property; depositing magnetic species on the first region of the intermediate layer to form an active region; and depositing non-ferromagnetic species on the modified region of the intermediate layer to form a separator, wherein the first region and the modified region have different structure and wherein the first region comprises one or more crystals and the modified region is amorphous.

2. The method according to claim 1, wherein the first region comprises one or more crystals in a preferred orientation.

3. The method according to claim 1, wherein the intermediate layer has at least one of Mg, Ta, and Ti.

4. The method according to claim 1, wherein the separator comprise $SiO_2$.

5. The method according to claim 1, wherein the modified region and the first region have at least one different species.

6. The method according to claim 1, wherein the modified region and the separator have at least one species in common.

7. The method according to claim 6, wherein the at least one species in common is Si.

8. The method according to claim 1, further comprising: etching a surface of the intermediate layer prior to the forming the active region and the separator.

9. The method according to claim 1 wherein the ion implantation is performed at an energy of 15 keV or less.

10. A method of forming a data storage media, the method comprising: forming an intermediate layer comprising a modified region and a first region adjacent to one another, wherein the modified region is formed by ion implantation, and wherein the modified region and the first region have at least one different property; depositing magnetic species on the first region of the intermediate layer to form an active region; and depositing non-ferromagnetic species on the modified region of the intermediate layer to form a separator, wherein the active region and the separator are formed simultaneously, wherein the first region comprises one or more crystals and the modified region is amorphous.

11. The method according to claim 10, wherein the first region comprises one or more crystals in a preferred orientation.

12. The method according to claim 10, wherein the ion implantation is performed at an energy of 15 keV or less.

13. The method according to claim 10, wherein the modified region and the separator contain Si.

14. A method of forming a data storage media, the method comprising: forming an intermediate layer comprising a first region and an amorphous region that are adjacent to one another, wherein the amorphous region is formed by ion implantation, and the first region comprising one or more crystals; depositing magnetic species on the first region of the intermediate layer to form an active region; and depositing non-ferromagnetic species on the amorphous region of the intermediate layer to form a separator.

15. The method according to claim 14, wherein the amorphous region is formed by performing an ion implantation at an energy of 15 keV or less.

16. The method according to claim 14, wherein the separator comprise $SiO_2$.

17. The method according to claim 14, wherein the first region and the amorphous region have at least one different species.

18. The method according to claim 14, wherein the modified region and the separator have at least one species in common.

19. A method of forming a data storage media, the method comprising: forming an intermediate layer comprising a modified region and a first region adjacent to one another, wherein the amorphous region is formed by ion implantation, and wherein the modified region and the first region have at least one different property; depositing magnetic species on the first region of the intermediate layer to form an active region; and depositing non-ferromagnetic species on the modified region of the intermediate layer to form a separator, wherein the first region and the modified region have different structure and wherein the first region is amorphous and the modified region comprises one or more crystals.

* * * * *